United States Patent
Li et al.

(10) Patent No.: US 9,064,113 B2
(45) Date of Patent: Jun. 23, 2015

(54) PERFORMING VIRUS SCAN DURING DECOMPRESSION OF AN APPLICATION INSTALLATION PACKAGE

(71) Applicant: Tencent Technology (Shenzhen) Company Limited, Shenzhen (CN)

(72) Inventors: Wei Li, Shenzhen (CN); Jingwei Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 122 days.

(21) Appl. No.: 14/010,459

(22) Filed: Aug. 26, 2013

(65) Prior Publication Data

US 2014/0041034 A1    Feb. 6, 2014

Related U.S. Application Data

(63) Continuation of application No. PCT/CN2013/079592, filed on Jul. 18, 2013.

(30) Foreign Application Priority Data

Jul. 19, 2012   (CN) .......................... 2012 1 0250361

(51) Int. Cl.
  *G06F 11/00*   (2006.01)
  *G06F 21/56*   (2013.01)
  *H04L 12/58*   (2006.01)

(52) U.S. Cl.
  CPC ............. *G06F 21/561* (2013.01); *H04L 12/585* (2013.01)

(58) Field of Classification Search
  CPC ..................................................... G06F 21/561
  USPC ..................................................... 726/23, 24
  See application file for complete search history.

(56) References Cited

U.S. PATENT DOCUMENTS

| 8,650,644 B1 * | 2/2014 | Ranjan et al. .................... 726/23 |
| 8,667,591 B1 * | 3/2014 | Claudatos et al. ............... 726/24 |
| 2012/0137365 A1 * | 5/2012 | Lee ................................ 726/23 |
| 2014/0205016 A1 * | 7/2014 | Yang et al. ............... 375/240.25 |

* cited by examiner

*Primary Examiner* — Joseph P Hirl
*Assistant Examiner* — Sayed Beheshti Shirazi
(74) *Attorney, Agent, or Firm* — Morgan, Lewis & Bockius LLP

(57) ABSTRACT

Disclosed in the present invention are a method and apparatus for checking a process of decompressing an application installation package. The present invention belongs to the technical field of security. The method comprises: decompressing a sub-portion of data in an application installation package to acquire decompressed data, the sub-portion of data being not greater than a threshold size; checking the decompressed data according to the virus samples in a virus feature library; and determining that the application installation package is a virus-infected file or rogue software when the decompressed data includes any of the virus samples. The technical solution of the present invention can effectively save the internal memory, shorten the checking time, and improve the checking efficiency in determining whether an application installation package is a virus-infected file or rogue software.

12 Claims, 6 Drawing Sheets

PERFORMING VIRUS SCAN DURING DECOMPRESSION OF AN APPLICATION INSTALLATION PACKAGE

RELATED APPLICATIONS AND PRIORITY CLAIMS

This application is a continuation application of PCT Patent Application No. PCT/CN2013/079592, entitled "METHOD AND APPARATUS FOR PERFORMING VIRUS SCAN DURING DECOMPRESSION OF AN APPLICATION INSTALLATION PACKAGE" filed on Jul. 18, 2013, which claims priority to Chinese Patent Application No. 201210250361.2, entitled "METHOD, APPARATUS, AND CLIENT TERMINAL FOR SCANNING DURING DECOMPRESSION OF AN APPLICATION INSTALLATION PACKAGE" filed on Jul. 19, 2012, both of which are incorporated herein by reference in their entireties.

TECHNICAL FIELD

The present invention relates to the field of computer security, and particularly, to a method and apparatus for performing a virus scan during decompressing an application installation package.

BACKGROUND

An application installation package is usually a compressed file, and the compressed file usually may include a resource file, a configuration file, an executable file, etc.

In the prior art, in order to check whether an application installation package is rogue software or a virus, the application installation package needs to be decompressed to acquire a complete executable file. Then, decompilation analysis is performed on the complete executable file in the internal memory to extract feature information. Then, the extracted feature information is compared to feature information contained in the virus samples in a pre-set virus feature library, thus checking whether the application installation package is rogue software or a virus-infected file.

There are at least the following problems in the prior art: in the prior art, when virus checking of an application installation package is required, the application installation package needs to be decompressed first to acquire a complete executable file, then decompilation analysis is performed on the acquired complete executable file in the internal memory to extract feature information. When the executable file is relatively large, storing the complete executable file in the internal memory will occupy much memory, and the process of extracting feature information is relatively time-consuming. Therefore, the virus checking efficiency of the prior art solution for checking whether an application installation package is a virus or rogue software is relatively low.

SUMMARY OF THE INVENTION

In order to solve the problems in the prior art, the embodiments of the present invention provide a method and apparatus for a virus checking process that performs the virus scan before the complete decompression of an application installation package is finished. For example, in some embodiments, one limited sub-portion of the application installation package is decompressed at a time, and a virus scan is performed on the corresponding decompressed data of the limited sub-portion before any additional sub-portions of the application installation package are decompressed. Alternatively, in some embodiments, the decompression and the virus scan are performed in parallel, where limited sub-portions of the application installation package are decompressed one by one in sequence, and a virus scan is started and performed on the corresponding uncompressed data of each uncompressed sub-portion one by one in sequence, in parallel with the continued decompression of additional sub-portions in the application installation package until the installation package is completely decompressed or if a currently checked portion is found to be consistent with a virus sample.

In one aspect, a method for checking a process of decompressing an application installation package is provided, the method comprising: decompressing a sub-portion of data in an application installation package to acquire corresponding decompressed data, wherein the sub-portion of data being decompressed is no greater than a threshold size; checking the decompressed data according to the virus samples in a virus feature library; and determining that the application installation package is a virus-infected file or rogue software when the corresponding decompressed data includes at least one of the virus samples.

Optionally, in the method as mentioned above, each of the virus samples comprises a respective offset address and a respective virus signature.

Optionally, in the method as mentioned above, the step of checking the corresponding decompressed data according to the virus samples in the virus feature library comprises: acquiring, from the corresponding decompressed data, virus checking data, the virus checking data uses the respective offset address of a virus sample as a starting point, and has a length equal to the respective length of the respective virus signature of the virus sample; making a comparison of the virus checking data with the respective virus signature; and determining that the corresponding decompressed data includes the virus sample when the virus checking data is consistent with the respective virus signature.

Optionally, in the method as mentioned above, before the step of acquiring, from the corresponding decompressed data, virus checking data, the virus checking data uses the respective offset address of a virus sample as a starting point, and has a length equal to the respective length of the respective virus signature of the virus sample, the method further comprises: determining whether the length of the virus checking data with the respective offset address of virus sample as its starting point in the corresponding decompressed data is greater than or equal to the length of the respective virus signature of the virus sample; and if not, acquiring, from the corresponding decompressed data, virus checking data, the virus checking data uses the respective offset address of a virus sample as a starting point, and has a length equal to the respective length of the respective virus signature of the virus sample comprises: acquiring, from the corresponding decompressed data of at least two sub-portions of the data in the application installation package, virus checking data corresponding to all the offset addresses between a starting offset address and an ending offset address, the virus checking data having a starting point at an offset address corresponding to a respective offset address of the virus sample, and a length equal to the respective length of the respective virus signature, wherein the starting offset address is the respective offset address of the virus sample, and the ending offset address is an offset address formed by the respective offset address of the virus sample plus the length of the respective virus signature.

Optionally, in the method as mentioned above, the method further comprises: repeating decompression and checking of data in sub-portions which are not greater than the threshold size, and stopping the decompression process if it is determined that the application installation package is a virus-infected file or rogue software.

Optionally, in the method as mentioned above, the method further comprises: repeating decompression and checking of data in sub-portions which are not greater than the threshold size, until the decompression of the application is completed.

In another aspect, an apparatus for checking a process of decompressing an application installation package is provided, the apparatus comprising: a decompression module for decompressing a sub-portion of data in an application installation package to acquire corresponding decompressed data, wherein the sub-portion of data being decompressed is no greater than a threshold size; a checking module for checking the decompressed data according to the virus samples in a virus feature library; and a determination module for determining that the application installation package is a virus-infected file or rogue software when the corresponding decompressed data includes at least one of the virus samples.

Optionally, in the apparatus as mentioned above, each of the virus samples comprises a respective offset address and a respective virus signature.

Optionally, in the apparatus as mentioned above, the checking module comprises: an acquisition unit for acquiring, from the corresponding decompressed data, virus checking data, the virus checking data uses the respective offset address of a virus sample as a starting point, and has a length equal to the respective length of the respective virus signature of the virus sample; a comparison unit for making a comparison of the virus checking data with the respective virus signature; and a determination unit for determining that the corresponding decompressed data includes the virus sample when the virus checking data is consistent with the respective virus signature.

Optionally, the apparatus as mentioned above further includes a judgment module, the judgment module is used for determining whether the length of the virus checking data with the respective offset address of virus sample as its starting point in the corresponding decompressed data is greater than or equal to the length of the respective virus signature of the virus sample; and the acquisition unit is also used for acquiring, from the corresponding decompressed data, virus checking data, the virus checking data uses the respective offset address of a virus sample as a starting point, and has a length equal to the respective length of the respective virus signature of the virus sample comprises: acquiring, from the corresponding decompressed data of at least two sub-portions of the data in the application installation package, virus checking data corresponding to all the offset addresses between a starting offset address and an ending offset address, the virus checking data having a starting point at an offset address corresponding to a respective offset address of the virus sample, and a length equal to the respective length of the respective virus signature, wherein the starting offset address is the respective offset address of the virus sample, and the ending offset address is an offset address formed by the respective offset address of the virus sample plus the length of the respective virus signature, when the judgment module determines that the length of the virus checking data with the respective offset address of virus sample as its starting point in the corresponding decompressed data is not greater than or equal to the length of the respective virus signature of the virus sample.

Optionally, in the apparatus as mentioned above, the decompression module and the checking module are further used repeating decompression and checking of data in sub-portions which are not greater than the threshold size, respectively, and if the determination module determines that the application installation package is a virus-infected file or rogue software, then the decompression module stops the decompression process.

Optionally, in the apparatus as mentioned above, the decompression module and the checking module are further used for repeating decompression and checking of data in sub-portions which are not greater than a threshold size, respectively, until the decompression of the application is completed.

In one aspect, a client device is provided, and any apparatus as mentioned above for checking a process of decompressing an application installation package is provided on the client device.

Optionally, in the client device as mentioned above, the client device is a mobile terminal or a fixed terminal.

The method and apparatus for checking a process of decompressing an application installation package and the client device in the embodiments of the present invention involve decompressing sub-portions of data in an application installation package which are not greater than a threshold size to acquire corresponding decompressed data; checking the corresponding decompressed data of each sub-portion according to the virus samples in a virus feature library; and determining that the application installation package is a virus-infected file or rogue software when the corresponding decompressed data of one or more sub-portions includes any of the virus samples. Compared to the prior art, in the technical solution of the embodiments of the present invention, decompressing data in an application installation package which are not greater than a threshold size to acquire decompressed data can effectively save the internal memory compared to acquiring a complete executable file obtained from decompressing the entire application installation package first, and performing decompilation on the complete executable file to extract feature information about the application installation package in the prior art. In addition, the technical solution of the embodiments of the present invention only needs to check the decompressed data of one or more sub-portions of application installation package at a time according to the virus samples in a virus feature library, and determine that the application installation package is a virus-infected file or rogue software. Thus, the checking time can be effectively shortened, improving the checking efficiency of determining whether an application installation package is a virus-infected file or rogue software.

DESCRIPTION OF THE DRAWINGS

In order to describe the technical solution of the embodiments of the present invention more clearly, drawings used in the description of the embodiments are introduced below. The drawings described below are merely some exemplary embodiments of the present invention. For those skilled in the art, on the premise of no inventive effort being involved, other drawings may also be obtained according to these drawings and the descriptions included herein.

DETAILED DESCRIPTION

In order to explain the objectives, technical solutions and advantages of the present invention more clearly, the embodiments of the present invention will be further described in detail below in conjunction with the drawings.

Embodiment I

Figure 1:
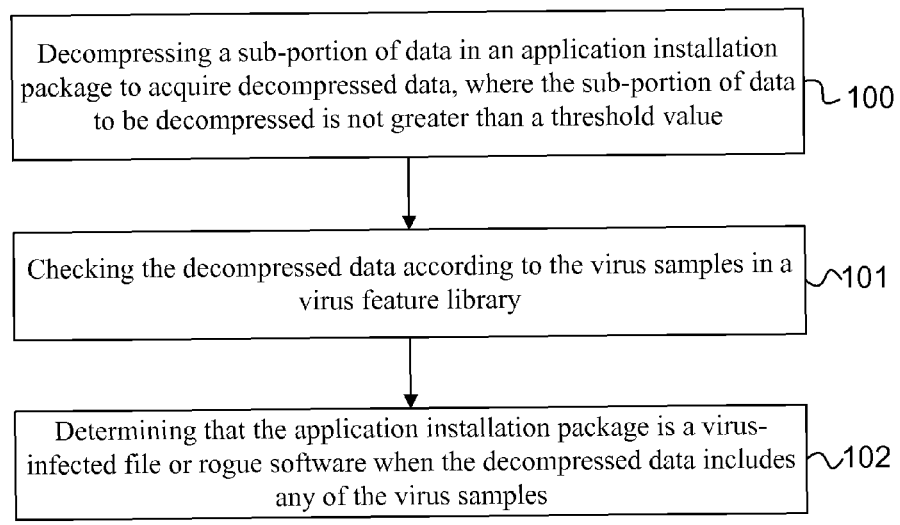
FIG. 1 is a flowchart of a method for checking a process of decompressing an application installation package provided in accordance with some embodiments.

FIG. 1 is a flowchart of a method for checking a process of decompressing an application installation package provided in embodiment I of the present invention. As shown in FIG. 1, the executive body of the method for checking a process of decompressing an application installation package in this embodiment is an apparatus for checking a process of decompressing an application installation package. For example, the apparatus for checking a process of decompressing an application installation package may be provided on a client device (e.g., a mobile telephone device). As shown in FIG. 1, the method for checking a process of decompressing an application installation package in this embodiment may particularly comprise the following steps:

Step 100: decompressing a sub-portion of data in an application installation package to acquire decompressed data, where the sub-portion of data being decompressed is not greater than a threshold size;

Step 101: checking the decompressed data according to the virus samples in a virus feature library; and Step 102: determining that the application installation package is a virus-infected file or rogue software when the decompressed data includes any of the virus samples.

The application installation package in this embodiment may be an application installation package under various systems, e.g., it may be an application installation package under the Windows system, and also may be an application installation package under the Android system. For example, the application installation package may be an application installation package under the Android system, which may also be called as an .apk file. When the application installation package is an .apk file, the corresponding executable file is a .dex file. The application installation package in this embodiment may also be an application installation package under the iOS system.

In some embodiments, the threshold size is determined according to actual requirements, for example, in order to reduce the space of the internal memory occupied during actual use. The threshold size may be set to dozens of Kilobytes, which is very small. In addition, in some embodiments, the threshold size may also be determined according to the size of the decompressed application installation package. In the technical solution of this embodiment, each time decompression is only performed on the sub-portion of data which is greater than or equal to the threshold size (size) in the application installation package, and virus checking is performed on the corresponding decompressed data of the sub-portion directly according to the virus samples in the virus feature library. Since only one sub-portion of data which is no greater than or equal to the threshold size is decompressed each time, the entire application installation package may be decompressed through an operation of repeated decompression of the small sub-portions one by one in sequence; and after each decompression, virus checking is performed on the corresponding decompressed data of a sub-portion that has just been decompressed according to the virus samples in the virus feature library. When the decompression of the complete application installation package is completed, and the decompressed data is checked to comprise any of the virus samples, the application installation package is determined to be a virus-infected file or rogue software. When the decompressed data is checked not to comprise the virus sample, the application installation package is determined not to be a virus-infected file or rogue software. The decompressed data here is not limited to the data obtained from decompression of one sub-portion of the application data package, and can be the decompressed data of multiple decompressions (e.g., multiple consecutive decompressions).

The method for checking a process of decompressing an application installation package in this embodiment involves decompressing data in an application installation package to acquire decompressed data, where the data being decompressed each time is not greater than a threshold size; checking the decompressed data according to the virus samples in a virus feature library; and determining that the application installation package is a virus-infected file or rogue software when the decompressed data includes any of the virus samples. Compared to the prior art, in the technical solution of present embodiment, decompressing only a sub-portion of data in an application installation package at a time, where the sub-portion of data is not greater than a threshold size can effectively save the internal memory compared to acquiring a complete executable file obtained from decompressing an application installation package, and performing decompilation on the complete executable file to extract feature information about the application installation package in the prior art. In addition, the technical solution of this embodiment only needs to check the decompressed data according to the virus samples in a virus feature library, and determine that the application installation package is a virus-infected file or rogue software. Thus the checking time can be effectively shortened, improving the checking efficiency of determining whether an application installation package is a virus-infected file or rogue software. This is different from decompilation of the complete executable file, and checking the decomplied executable file, and is more efficient because unnecessary steps of the decompilation are eliminated.

Optionally, on the basis of the technical solution of the embodiment as shown in the above-mentioned FIG. 1, the virus samples in the virus feature library comprise offset addresses and virus signatures.

For example, a virus sample may comprise an offset address and a virus signature corresponding to the offset address, i.e. the offset address and the virus signature are in a one-to-one correlation with each other. A virus sample may also comprise a plurality of offset addresses and a respective virus signature corresponding to each offset address of the plurality of offset addresses, i.e. comprising a plurality of pairs of correlations between the offset addresses and the virus signatures. Various virus samples in the virus feature library may have the same offset address, and may also have a plurality of different offset addresses. The offset address refers to the address of each item of data in an internal memory or a cache. The offset address counts from the first byte of a file, and the initial value thereof is 0. The virus signature is a segment of data that is unique for a virus and is used for making a comparison with other data that is suspected to include the virus. The virus signature has a designated length. If the data in a certain file has the designated length and has the offset address as its starting point in the certain file, and if the data is the same as the virus signature, then the file is considered to be a virus-infected file.

For example, suppose that the offset address of a virus sample may be 66, i.e. locating the address of 00000066h of a file to be scanned. Those skilled in the art would know that this locating may be realized by means of a file pointer. When a file is open and stored in a cache, a file pointer points to the initial address 00000000h of the file. It needs to be noted that the offset address of a virus sample as an example here is merely an illustration for describing an acquisition method, and does not limit the actual composition of a virus sample.

When a virus sample comprises a plurality of pairs of offset addresses and virus signatures, the corresponding decompressed data comprising a virus sample may particularly refer to the decompressed data comprising the virus signature corresponding to each offset address. In addition, the decompressed data here is not limited to the decompressed data obtained from one decompression of data which is greater than or equal to a threshold size, but may also refer to a plurality of lots of decompressed data obtained by successively and respectively decompressing a plurality of lots of data which are equal to the threshold size.

Moreover, optionally, on the basis of the technical solution of the embodiment as shown in the above-mentioned FIG. 1, the step 101 "checking the decompressed data according to the virus samples in a virus feature library" may particularly comprise the following steps: (1) acquiring, from the decompressed data, virus checking data with the offset address as its starting point and a length equal to the length of the virus signature; (2) making a comparison of the virus checking data with the virus signature; when the virus checking data is consistent with the virus signature, executing step (3); otherwise, when the virus checking data is inconsistent with the virus signature, executing step (4); (3) concluding that the decompressed data comprises the virus sample; and (4) concluding that the decompressed data does not comprise the virus sample.

Moreover, optionally, before step (1) "acquiring, from the decompressed data, virus checking data with the offset address as its starting point and the length equal to the length of the virus signature" in the above-mentioned embodiment, the method optionally further comprises: judging whether the length of the data in the decompressed data after the offset address as the starting point is greater than or equal to the length of the virus signature; and determining that the length of the data after the offset address as its starting point in the decompressed data is greater than or equal to the length of the virus signature.

For example, if the threshold size is 30 k, and the virus sample comprises a virus signature A of which the offset address is 32 and the length is 10 k and a virus signature B of which the offset address is 45 and the length is 15 k. Since the threshold size is 30 k, at the first decompression time, data of 30 k is obtained from decompressing a portion of an application installation package according to the threshold size 30 k, and assuming that the corresponding offset address is 0-30. After the first decompression, the decompressed data does not comprise the offset addresses of the virus sample, and further checking of the decompressed data will not be performed at this time. At the second decompression time, when decompressing the application installation package according to the threshold size, another block of 30 k data is also obtained, and the corresponding offset address is 31-60. At this time, the decompressed data comprises the offset addresses 32 and 45 of the virus sample, and now, virus checking data 1 with the offset address 32 as its starting point and the length equal to the length of the virus signature 10 k, and virus checking data 2 with the offset address 45 as its starting point and the length equal to the length of the virus signature 15 k, are acquired from the decompressed data obtained from the second decompression. Then, the virus checking data 1 and the virus signature A, and the virus checking data 2 and the virus signature B are compared, respectively. When the virus checking data 1 is consistent with the virus signature A, and the virus checking data 2 is consistent with the virus signature B, the decompressed data is determined to include the virus sample, and the application installation package is determined to be a virus-infected file or rogue software. Otherwise, when the virus checking data 1 is inconsistent with the virus signature A or the virus checking data 2 is inconsistent with the virus signature B, the decompressed data is determined not to include the virus sample, and the application installation package is determined to be neither a virus-infected file nor rogue software.

Further optionally, when the length of the data with the offset address as its starting point in the decompressed data is shorter than the length of the virus signature, the above-mentioned step (1) "acquiring, from the decompressed data, the virus checking data with the offset address as its starting point and the length equal to the length of the virus signature" may particularly comprise: acquiring, from at least two lots of the decompressed data corresponding to all the offset addresses between a starting offset address and an ending offset address, the virus checking data having the offset address as its the starting point and the length equal to the length of the virus signature, wherein the starting offset address is the offset address of a virus sample in the virus feature library, and the ending offset address is an offset address formed by the offset address of the virus sample in the virus feature library plus the length of the virus signature.

For example, if the threshold size is 30 k, and the virus sample comprises a virus signature A of which the offset address is 32 and the length is 10 k and a virus signature B of which the offset address is 58 and the length is 20 k. Since the threshold size is 30 k, at the first decompression time, data of 30 k is obtained from decompressing a portion of an application installation package according to the threshold size. Assuming that the corresponding offset address is 0-30, after the first decompression, the decompressed data does not comprise the offset addresses of the virus sample, and checking will not be performed at this time. At the second decompression time, when decompressing the application installation package according to the threshold size, an additional block of data of 30 k is also obtained, and the corresponding offset address is 31-60. At this moment, the decompressed data comprises the offset address 32 of the virus sample, and at this moment, virus checking data 1 having the offset address 32 serves as its starting point and the length equal to the length of the virus signature 10 K, is acquired from the decompressed data obtained from the second decompression. In addition, the decompressed data obtained from this second round of decompression also comprises the offset address 58, but virus checking data 2 with the offset address 58 as the starting point and the length equal to 20 k needs to be selected. However, in this data decompression, the length of data after the offset address 58 is only of length 2 k, which is shorter than the length 20 k required of the virus checking data 2. At this moment, the 2 k of data with the offset address 58-60 may be first selected to be temporarily stored in the internal memory, then a third around of decompression will be performed. In the third round of decompression, an additional block of data of 30 k may also be obtained, and the corresponding offset address is 61-90. At this moment, additional data of 18 k of which the offset address is from 61 to (58+20=78) may be continuously acquired. At this moment, virus checking data with the offset address as its starting point and the length equal to the length of the virus signature needs to be acquired correspondingly from two lots of decompressed data corresponding to all the offset addresses between a starting offset address 58 to an ending offset address, wherein the starting offset address is the offset address 58 of the virus sample in the virus feature library, and the ending offset address 78 is the offset address formed by the offset address 58 of the virus sample in the virus feature library plus the length of the virus signature 20 k. The above scenario takes acquiring virus checking data from two lots of decompressed data corresponding to all the offset addresses between a starting offset address and an ending offset address as an example, and in actual practice, when the length of a virus signature is long enough, virus checking data may also be acquired from more lots of decompressed data.

Applying the above-mentioned method, virus checking data 1 with the offset address 32 as its starting point and the length of 10 k is acquired from the decompressed data, and virus checking data 2 with the offset address 58 as its starting point and the length of 20 k is acquired from two continuous lots of decompressed data. Then, the virus checking data 1 and the virus signature A, and the virus checking data 2 and the virus signature B are compared, respectively. Similarly as above, when the virus checking data 1 is consistent with the virus signature A, and the virus checking data 2 is consistent with the virus signature B, the decompressed data is determined to include the virus sample, and the application installation package is determined to be a virus-infected file or rogue software. Otherwise, when the virus checking data 1 is inconsistent with the virus signature A or the virus checking data 2 is inconsistent with the virus signature B, the decompressed data is determined not to include the virus sample and the application installation package is determined to be neither a virus-infected file nor rogue software.

In the above-mentioned example embodiment, the example is provided with respect to the scan for a single virus sample. In actual practice, each item of decompressed data in an application installation package needs to be compared with each virus sample in a virus feature library, and as long as the decompressed data includes one virus sample, the application installation package is determined to be a virus-infected file or a rogue program.

Specifically, steps 100-102 in the embodiment as shown in the above-mentioned FIG. 1 may be executed repeatedly, so as to repeat decompression and checking of data which is not greater than a threshold size, and if the application installation package is determined to be a virus-infected file or rogue software, the decompression will be stopped at that point. The solution is applied to the situation where the application installation package is judged to be a virus-infected file or rogue software when the decompression of the application installation package is not yet completed, and at this moment, subsequent decompression may be stopped to reduce unnecessary decompression processing.

Alternatively, in some embodiments, steps 100-102 in the embodiment as shown in the above-mentioned FIG. 1 may also be executed to repeat decompression and checking of data which is not greater than a threshold size, until the decompression of the application is completed. The solution is applied to the situation where in the process of repeating the decompression and checking of an application installation package, the application installation package is never found to be a virus-infected file or rogue software, and in such a case, the decompression of the application installation package needs to be completed to check each item of the decompressed data obtained from decompression, so as to ensure the checking quality.

Optionally, on the basis of the technical solution of the embodiment as shown in the above-mentioned FIG. 1, before step 100 "decompressing a sub-portion of data in an application installation package to acquire decompressed data, where the sub-portion of data being decompressed is not greater than a threshold size", the method for checking a process of decompressing an application installation package in the above-mentioned embodiment further comprises the following steps:

(a) judging whether the size of the data which is not decompressed in the application installation package is greater than or equal to the threshold size; if the size of the data which are not decompressed in the application installation package is greater than the threshold size, executing step (b); moreover, optionally, if the size of the data which is not decompressed in the application installation package is smaller than the threshold size, executing step (c);

(b) reading, from the data not yet decompressed in the application installation package, a block of data having a size equal to the threshold size; moreover, optionally, executing step (d);

(c) reading the data not yet decompressed in the application installation package; moreover, optionally, executing step (e);

(d) decompressing the block of data of the size equal to the threshold size in the application installation package. Step (d) may be considered to be a specific implementation of step 100 "decompressing a sub-portion of data in an application installation package, where the sub-portion of data is not greater than a threshold size" in the above-mentioned embodiment.

(e) Decompressing the data of the size smaller than a designated size in the application installation package. Step (e) may be considered to be another specific implementation method of step 100 "decompressing a sub-portion of data in an application installation package to acquire decompressed data, where the sub-portion of data is not greater than a threshold size" in the above-mentioned embodiment.

Figure 2A:
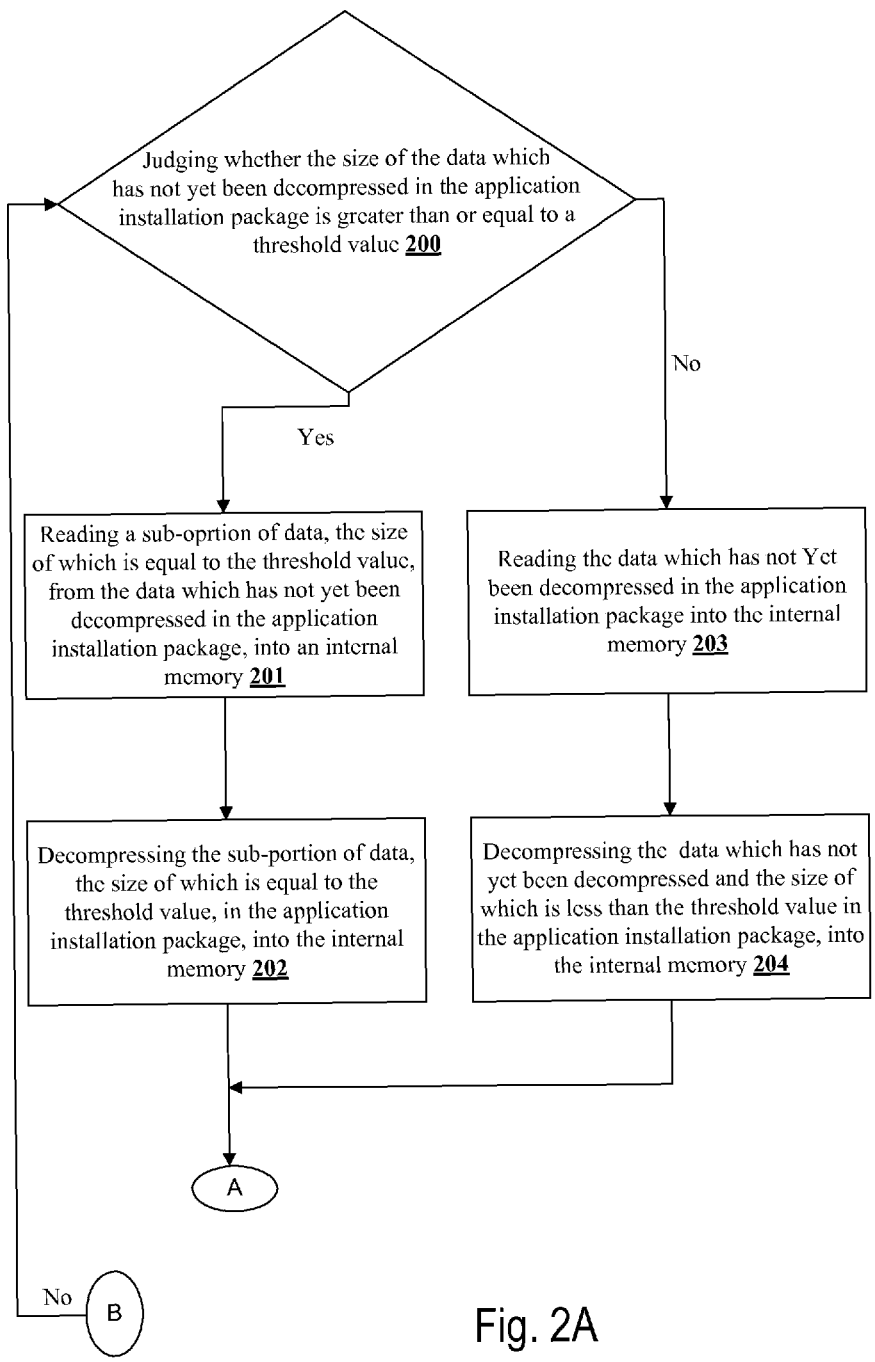
FIGS. 2A-2B is a flowchart of a method for checking a process of decompressing an application installation package provided in accordance with some embodiments.
Figure 2B:
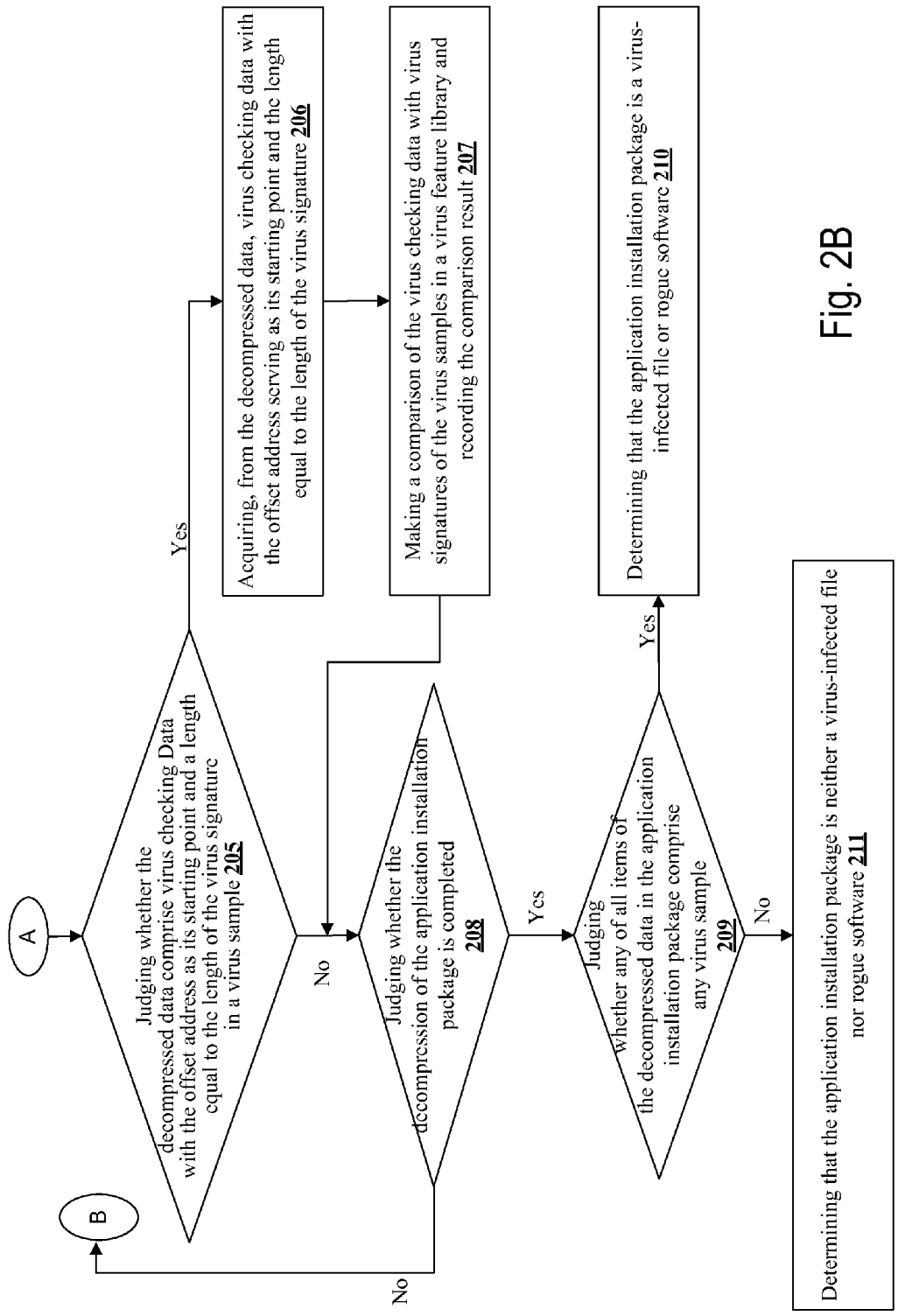

Making a comparison of the method for checking a process of decompressing an application installation package in the above-mentioned embodiment with the prior art, in the technical solution of the above-mentioned embodiment, decompressing data in an application installation package in portions which are not greater than a threshold size to acquire decompressed data can effectively save the internal memory compared to acquiring a complete executable file obtained from decompressing an application installation package, and performing decompilation on the complete executable file to extract feature information about the application installation package in the prior art. In addition, the technical solution of the above-mentioned embodiment only needs to check the decompressed data according to the virus samples in a virus feature library, and determine that the application installation package is a virus-infected file or rogue software. Thus the checking time can be effectively shortened, improving the checking efficiency of determining whether an application installation package is a virus-infected file or rogue software.
Embodiment II FIGS. 2A-2B is a flowchart of a method for checking a process of decompressing an application installation package provided in accordance with some embodiments of the present invention. As shown in FIGS. 2A-2B, on the basis of the above-mentioned embodiments, the method for checking a process of decompressing an application installation package in this embodiment further introduces the technical solution of the present invention in detail in conjunction with the application scenario thereof, and similarly, the executive body of the method for checking a process of decompressing an application installation package in this embodiment is still an apparatus for checking a process of decompressing an application installation package. As shown in FIGS. 2A-2B, the method for checking a process of decompressing an application installation package in this embodiment may particularly comprise the following steps:

Step 200: judging whether the size of the data which is not yet decompressed in an application installation package is greater than or equal to a threshold size; if it is greater than or equal to the threshold size, executing step 201, otherwise if it is smaller than the threshold size, executing step 203.

In some embodiments, the threshold size is of a pre-set size, and in order to reduce internal memory occupation, the threshold size may be determined to be relatively small. Thus, generally, the application installation package has a size greater than the threshold size. In such a case, it is possible to skip step 200, and directly execute step 201. However, in order to prevent relatively small application installation packages from being missed for checking, step 200 is generally the preferred starting step.

Step 201: reading data of which the size is equal to the threshold size from the data which has not yet been decompressed in the application installation package to an internal memory; and executing step 202.

Step 202: decompressing data of which the size is equal to the threshold size in the application installation package in the internal memory to obtain decompressed data; and executing step 205.

Step 203: reading the data which has not yet been decompressed in the application installation package to the internal memory; and executing step 204.

Step 204: decompressing data which has not yet been decompressed in the application installation package and of which the size is smaller than the threshold size, in the internal memory to obtain decompressed data; and executing step 205.

Step 205: judging whether the decompressed data includes virus checking data with the offset address as its starting point and the length equal to the length of the virus signature in a virus sample, if yes, executing step 206, and if not, executing step 208.

Step 206: acquiring, from the decompressed data, virus checking data with the offset address as its starting point and the length equal to the length of the virus signature, executing step 207.

Step 207: making a comparison of whether the virus checking data is consistent with the virus signatures of the virus samples in a virus feature library and recording the comparison result; and executing step 208.

Step 208: judging whether the decompression of the application installation package is completed, and when the decompression is completed, executing step 209; otherwise when the decompression is not completed, executing step 200.

Step 209: judging whether a virus sample is found among any of all lots of the decompressed data in the application installation package, and if yes, executing step 210; otherwise, executing step 211.

In particular, judging whether any of all lots of the decompressed data in the application installation package includes a virus sample, may be based on the comparison results obtained in Step 207. When any of all lots of the decompressed data includes all the virus signatures of a virus sample according to the comparison results recorded each time in Step 207, it is determined that a virus sample is included in at least one of all lots of the decompressed data. Otherwise, when all lots of the decompressed data do not include all the virus signatures of any virus sample, it is determined that the items of decompressed data of the application installation package do not include the virus sample.

Step 210: Determining that the application installation package is a virus-infected file or rogue software.

Step 211: Determining that the application installation package is neither a virus-infected file nor rogue software.

Optionally, after judging whether the decompressed data includes virus checking data with the offset address as its starting point and the length equal to the length of the virus signature in a virus sample in step 205, if the virus checking data is not included, whether the current decompressed data comprise virus checking data with the offset address as its starting point and the length shorter than the length of the virus signature in the virus sample may be further judged. Since the decompressed data is decompressed according to the threshold size each time, it may result in segmenting the virus checking data to be acquired into two segments, wherein the former part is in the current lot of decompressed data, and the latter part is in another subsequent lot of decompressed data which are not yet decompressed. In such a case, the former part of the virus checking data may be acquired first from the decompressed data, and according to the length of the former part of the virus checking data, and the offset address and the length of the corresponding virus signature in the virus sample, a starting offset address of the latter part of the virus checking data and the length of the latter part of the virus checking data are calculated. Then, decompression of the application installation package is continued according to the threshold size, and the latter part of the virus checking data is acquired according to the calculated starting offset address of the latter part of the virus checking data and the length of the latter part of the virus checking data. Then, the acquired former part of the virus checking data and the latter part of the virus checking data are combined to obtain complete virus checking data, and compared according to Step 207, which will not be described here redundantly. It needs to be noted that when the length of a virus signature is long enough, it may also need to acquire complete virus checking data from a plurality of lots of continuous decompressed data, and examples will not be given one by one here.

Making a comparison of the method for checking a process of decompressing an application installation package in this embodiment with the prior art, in the technical solution of the above-mentioned embodiment, decompressing data in an application installation package in chunks which are not greater than a threshold size to acquire decompressed data can effectively save the internal memory compared to acquiring a complete executable file obtained from decompressing an application installation package, and performing decompilation on the complete executable file to extract feature information about the application installation package in the prior art. In addition, the technical solution of the above-mentioned embodiment only needs to check the decompressed data according to the virus samples in a virus feature library, and determine that the application installation package is a virus-infected file or rogue software, thus the checking time can be effectively shortened, improving the checking efficiency of determining whether an application installation package is a virus-infected file or rogue software.

Embodiment III

Figure 3:
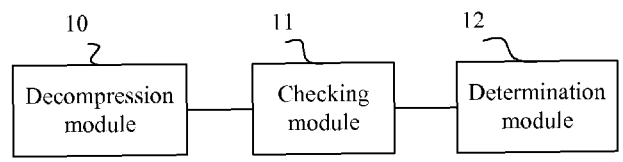
FIG. 3 is a structural schematic diagram of an apparatus for checking a process of decompressing an application installation package provided in accordance with some embodiments.

FIG. 3 is a structural schematic diagram of an apparatus for checking a process of decompressing an application installation package provided in accordance with some embodiments of the present invention. As shown in FIG. 3, the apparatus for checking a process of decompressing an application installation package in this embodiment may particularly comprise: a decompression module 10, a checking module 11, and a determination module 12.

The decompression module 10 is used for decompressing data in an application installation package in sub-portions or chunks to acquire decompressed data, where each sub-portion or chunk is not greater than a threshold size. The checking module 11 connects to the decompression module 10, and the checking module 11 is used for checking decompressed data obtained by the decompression module 10 according to the virus samples in a virus feature library. The determination module 12 connects to the checking module 11, and the determination module 12 is used for determining that the application installation package is a virus-infected file or rogue software when the checking module 11 checks that the decompressed data comprises virus sample(s).

The apparatus for checking a process of decompressing an application installation package in this embodiment applies the above-mentioned modules to realize the checking of a process of decompressing an application installation package, which is the same as the realization of the above-mentioned relevant method embodiments, and the recording of the above-mentioned relevant method embodiments may be taken as a reference for detail, which will not be described here.

The apparatus for checking a process of decompressing an application installation package in this embodiment, by using the above-mentioned modules, decompresses data in an application installation package in sub-portions or chunks which are not greater than a threshold size to acquire decompressed data using the above-mentioned modules; checks the decompressed data according to the virus samples in a virus feature library; and determines that the application installation package is a virus-infected file or rogue software when the decompressed data includes any of the virus samples. Compared to the prior art, in the technical solution of this embodiment, decompressing data in an application installation package in sub-portions which are not greater than a threshold size to acquire decompressed data can effectively save the internal memory compared to acquiring a complete executable file obtained from decompressing an application installation package, and performing decompilation on the complete executable file to extract feature information about the application installation package in the prior art; in addition, the technical solution of this embodiment only needs to check the decompressed data according to the virus samples in a virus feature library, and determine that the application installation package is a virus-infected file or rogue software, thus the checking time can be effectively shortened, improving the checking efficiency of determining whether an application installation package is a virus-infected file or rogue software.

Embodiment IV

Figure 4:
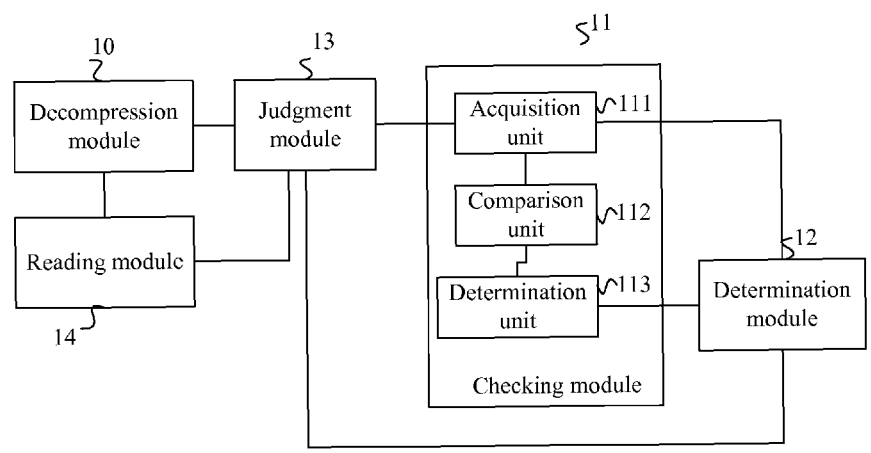
FIG. 4 is a structural schematic diagram of an apparatus for checking a process of decompressing an application installation package provided in accordance with some embodiments.

FIG. 4 is a structural schematic diagram of an apparatus for checking a process of decompressing an application installation package provided in accordance with some embodiments of the present invention. As shown in FIG. 4, on the basis of the embodiment as shown in the above-mentioned FIG. 3, the apparatus for checking a process of decompressing an application installation package in this embodiment may further comprise the following technical solution.

In the apparatus for checking a process of decompressing an application installation package in this embodiment, the virus sample comprises an offset address and a virus signature.

Optionally, in the apparatus for checking a process of decompressing an application installation package in this embodiment, the checking module 11 may particularly comprise an acquisition unit 111, a comparison unit 112 and a determination unit 113.

The acquisition unit 111 connects to the decompression module 10, and is used for acquiring virus checking data with the offset address as its starting point and the length equal to the length of the virus signature from the decompressed data obtained from decompression by the decompression module 10; the comparison unit 112 connects to the acquisition unit 111, and the comparison unit 112 is used for making a comparison of the virus checking data acquired by the acquisition unit 111 with the virus signature; and the determination unit 113 connects to the comparison unit 112, and the comparison unit 113 is used for determining that the decompressed data comprises the virus sample, when it is determined that the virus checking data is consistent with the virus signature from the comparison made by the comparison unit 112; otherwise, determining that the decompressed data does not comprise the virus sample if it is determined that the virus checking data is inconsistent with the virus signature from the comparison made by the comparison unit 112. The determination module 12 particularly connects to the determination unit 113, and the determination module 12 is used for determining that the application installation package is a virus-infected file or rogue software when the determination unit 113 determines that the decompressed data comprises the virus sample.

Moreover, optionally, the apparatus for checking a process of decompressing an application installation package in this embodiment further comprises a judgment module 13.

The judgment module 13 connects to the decompression module 10, and the judgment module 13 is used for judging whether the length of the data after having the offset address as the starting point in the decompressed data obtained by the decompression module 10 is greater than or equal to the length of the virus signature, before the acquisition unit 111 acquires, from the decompressed data, virus checking data with the offset address as its starting point and the length equal to the length of the virus signature. The determination module 12 also connects to the judgment module 13, and the determination module 12 is also used for determining that the length of the data after having the offset address as its starting point in the decompressed data is greater than or equal to the length of the virus signature according to the judgment result of the judgment module 13. The acquisition unit 111 also connects to the determination module 12, and the acquisition unit 111 is used for acquiring, from the decompressed data, virus checking data with the offset address as its starting point and the length equal to the length of the virus signature after the determination module 12 determines that the length of the data after having the offset address as its starting point in the decompressed data is greater than or equal to the length of the virus signature.

Moreover, optionally, the acquisition unit 111 in the apparatus for checking a process of decompressing an application installation package in this embodiment also connects to the judgment module 13, and the acquisition unit 111 is also used for acquiring, from at least two lots of the decompressed data corresponding to all the offset addresses between a starting offset address and an ending offset address, the virus checking data with the offset address as its starting point and the length equal to the length of the virus signature, when the judgment module 13 judges that the length of the data with the offset address as its starting point in the decompressed data is shorter than the length of the virus signature, wherein the starting offset address is the offset address, and the ending offset address is an offset address formed by the offset address plus the length of the virus signature.

Moreover, optionally, in the apparatus for checking a process of decompressing an application installation package in this embodiment, the decompression module 10 and the checking module 11 are further used for repeating decompression and checking of data in sub-portions or chunks which are not greater than a threshold size, respectively, and if the determination module 12 determines that the application installation package is a virus-infected file or rogue software, then the decompression module 10 stops the decompression.

Moreover, optionally, in the apparatus for checking a process of decompressing an application installation package in this embodiment, the decompression module 10 and the checking module 11 are further used for repeating decompression and checking of data in sub-portions or chunks which are not greater than a threshold size, respectively, until the decompression of the application is completed.

For example, particularly, the apparatus for checking a process of decompressing an application installation package in this embodiment may further comprise a reading module 14.

The judgment module 13 is further used for judging whether the size of the data which has not yet been decompressed in the application installation package is greater than or equal to the threshold size before the decompression module 10 decompresses data in an application installation package in sub-portions or chunks which are not greater than a threshold size; the reading module 14 connects to the judgment module 13, and the reading module 14 is used for reading a sub-portion of data of which the size is equal to the threshold size, from the data which has not yet been decompressed in the application installation package, if the judgment module 13 determines that the size of the data which has not yet been decompressed in the application installation package is greater than or equal to the threshold size. The decompression module 10 connects to the reading module 14, and the decompression module 10 is particularly used for decompressing data of which the size is equal to the threshold size in the application installation package, and which has been read by the reading module 14, to acquire decompressed data.

Moreover, optionally, on the basis of the above-mentioned technical solution, the reading module 14 in the apparatus for checking a process of decompressing an application installation package in this embodiment is further used for reading the data which has not yet been decompressed in the application installation package if the judgment module 13 determines that the size of the data which has not yet been decompressed in the application installation package is smaller than the threshold size. The decompression module 10 is particularly used for decompressing data which has not yet been decompressed and the size of which is smaller than the threshold size in the application installation package, and which has been read by the reading module 14, to acquire decompressed data.

The apparatus for checking a process of decompressing an application installation package in the embodiment as shown in FIG. 4 takes all the above-mentioned alternative technical solutions as an example to describe the technical solution of the present invention, and in actual practice, all the above-mentioned alternative technical solutions may use any combinable method to form the alternative technical solutions of the embodiments of the present invention, and examples will not be given one by one here.

The apparatus for checking a process of decompressing an application installation package in this embodiment applies the above-mentioned modules to realize the checking of a process of decompressing an application installation package, which is the same as the realization of the above-mentioned relevant method embodiments, and the recording of the above-mentioned relevant method embodiments may be taken as a reference for detail, which will not be described here.

Compared to acquiring a complete executable file obtained from decompressing an application installation package, and performing decompilation on the complete executable file to extract feature information about the application installation package in the prior art, the apparatus for checking a process of decompressing an application installation package in this embodiment can effectively save the internal memory through the technical solution using the above-mentioned modules. In addition, the technical solution of this embodiment only needs to check the decompressed data according to the virus samples in a virus feature library, and determine that the application installation package is a virus-infected file or rogue software. Thus the checking time can be effectively shortened, improving the checking efficiency of determining whether an application installation package is a virus-infected file or rogue software.

Embodiment V

Figure 5:
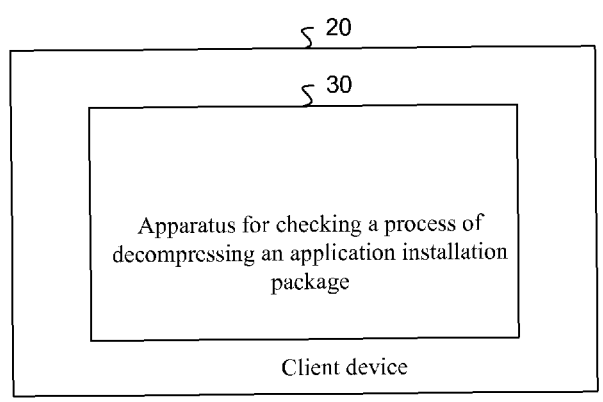
FIG. 5 is a structural schematic diagram of a client device provided in accordance with some embodiments.

FIG. 5 is a structural schematic diagram of a client device provided in accordance with some embodiments of the present invention. As shown in FIG. 5, an apparatus 30 for checking a process of decompressing an application installation package is also provided on a client device 20 of this embodiment.

In particular, the apparatus 30 for checking a process of decompressing an application installation package in the client device of this embodiment may particularly use the apparatus for checking a process of decompressing an application installation package as shown in the above-mentioned FIG. 3 or FIG. 4, and may particularly be realized using the method of the embodiment as shown in the above-mentioned FIG. 1 or FIGS. 2A-2B.

Optionally, the client device of this embodiment may particularly be a mobile terminal or a fixed terminal.

The client device of this embodiment, by using the above-mentioned apparatus for checking a process of decompressing an application installation package, may decompress data in an application installation package in sub-portions or chunks which are not greater than a threshold size to acquire decompressed data; check the decompressed data according to the virus samples in a virus feature library; and determine that the application installation package is a virus-infected file or rogue software when the decompressed data includes any of the virus samples. Compared to the prior art, in the technical solution of present embodiment, decompressing data in an application installation package which are not greater than a threshold size to acquire decompressed data can effectively save the internal memory compared to acquiring a complete executable file obtained from decompressing an application installation package, and performing decompilation on the complete executable file to extract feature information about the application installation package in the prior art. In addition, the technical solution of this embodiment only needs to check the decompressed data according to the virus samples in a virus feature library, and determine that the application installation package is a virus-infected file or rogue software. Thus the checking time can be effectively shortened, improving the checking efficiency of determining whether an application installation package is a virus-infected file or rogue software.

It needs to be noted that when the apparatus for checking a process of decompressing an application installation package provided by the above-mentioned embodiments checks an application installation package, the division of the above-mentioned various functional modules is merely taken as an example for description, and in actual practice, the above-mentioned functions may be assigned to be achieved by different functional modules as required, i.e. dividing the internal structure of the apparatus into different functional modules, so as to achieve all or some of the functions of the above description. In addition, the apparatus for checking a process of decompressing an application installation package provided by the above-mentioned embodiments and the embodiments of the method for checking a process of decompressing an application installation package belong to the same concept, and please see the method embodiments for details for the particular realization processes thereof, which will not be described here redundantly.

The reference numbers of the above-mentioned embodiments of the present invention are merely for description, rather than representing whether the embodiment is good or bad.

Those skilled in the art would understand that all or some of the steps for realizing the above-mentioned embodiments can be achieved by hardware, and can also be achieved by instructing relevant hardware by a program, which program can be stored in a computer readable storage medium, and the above-mentioned storage medium can be a read-only memory, a disk or an optical disk.

What are mentioned above are merely preferred embodiments of the present invention, which are not intended to limit the present invention; and any modifications, equivalent substitutions, improvements, etc. made within the spirit and principles of the present invention shall be covered in the scope of protection of the present invention.

Figure 6:
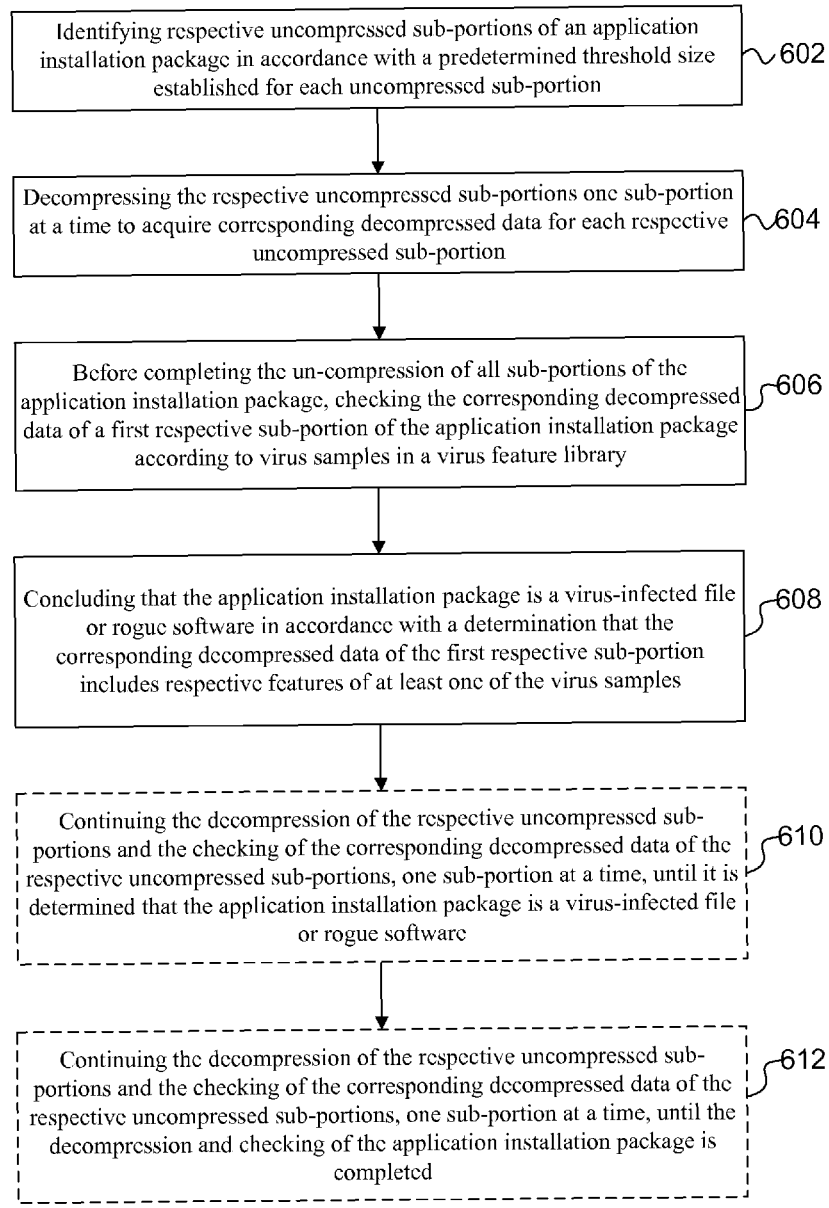
FIG. 6 is a flowchart of a method for checking a process of decompressing an application installation package provided in accordance with some embodiments.

Accordingly, based on the above descriptions, an exemplary method of checking for virus during a decompression process of an application installation package is provided with respect to FIG. 6.

In the example process in FIG. 6, at a device having one or more processors and memory: the device identifies (602) respective uncompressed sub-portions of an application installation package in accordance with a predetermined threshold size established for each uncompressed sub-portion. The device decompresses (604) the respective uncompressed sub-portions one sub-portion at a time to acquire corresponding decompressed data for each respective uncompressed sub-portion. Before completing the un-compression of all sub-portions of the application installation package, the device checks (606) the corresponding decompressed data of a first respective sub-portion of the application installation package according to virus samples in a virus feature library. The device concludes (608) that the application installation package is a virus-infected file or rogue software in accordance with a determination that the corresponding decompressed data of the first respective sub-portion includes respective features of at least one of the virus samples.

In some embodiments, each of the virus samples includes at least one respective offset address and a respective virus signature at the at least one respective offset address.

In some embodiments, to check the corresponding decompressed data of the first respective sub-portion according to the virus samples in the virus feature library, the device further performs the following: (1) acquiring, from the corresponding decompressed data of the first respective sub-portion, respective virus checking data, wherein the respective virus checking data starts from an offset address corresponding to the respective offset address of a first virus sample, and has a length equal to a respective length of a respective virus signature of the first virus sample; (2) making a comparison of the respective virus checking data with the respective virus signature of the first virus sample; and (3) determining that the respective decompressed data of the first respective sub-portion contains the first virus sample when the virus checking data is consistent with the respective virus signature of the first virus sample. In some embodiments, the first respective sub-portion of the application installation package optionally includes more than one sub-portion of data in the application installation package that is of the predetermined threshold size. For example, when the virus signature is large enough to span the corresponding decompressed data of multiple consecutive sub-portions of the application installation package, the first respective sub-portion of the application installation package includes the multiple consecutive sub-portions of the application installation package.

In some embodiments, to acquire the virus checking data, the device further performs the following: (1) identifying, from among the respective uncompressed sub-portions of the application installation package, a next uncompressed sub-portion for which virus checking has not been performed; (2) determining whether the corresponding decompressed data of the identified next uncompressed sub-portion has a length greater than or equal to the respective length of the respective virus signature of the first virus sample, starting from the offset address corresponding to the respective offset address of the first virus sample; and (3) in accordance with a determination that the corresponding decompressed data of the identified uncompressed sub-portion does not have a sufficient length starting from the offset address corresponding to the respective offset address of the first virus sample, acquiring, the virus checking data from the corresponding uncompressed data of at least one additional uncompressed sub-portion for which virus checking has not been performed, wherein the virus checking data includes decompressed data corresponding to all offset addresses between a starting offset address and an ending offset address, wherein the starting offset address is the respective offset address of the first virus sample, and the ending offset address is an offset address formed by the starting offset address plus the respective length of the respective virus signature of the first virus sample.

In some embodiments, the device continues (610) the decompression of the respective uncompressed sub-portions and the checking of the corresponding decompressed data of the respective uncompressed sub-portions, one sub-portion at a time, until it is determined that the application installation package is a virus-infected file or rogue software.

In some embodiments, the device continues (612) the decompression of the respective uncompressed sub-portions and the checking of the corresponding decompressed data of the respective uncompressed sub-portions, one sub-portion at a time, until the decompression and checking of the application installation package is completed.

In some embodiments, the device continues the decompression of the respective uncompressed sub-portions and the checking of the corresponding decompressed data of the respective uncompressed sub-portions in parallel, until the decompression of the application installation package is completed. For example, in some embodiments, the decompression of the next sub-portion of the installation package may be suspended, until the comparison against the virus samples in the virus library are completed for the decompressed data of a current sub-portion of the installation package. In some embodiments, the decompression of the next sub-portion of the installation package may proceed, while the comparison against the virus samples in the virus library are in still progress for the decompressed data of a current sub-portion of the installation package, provided that there is sufficient memory and processing power on the device.

Figure 7:
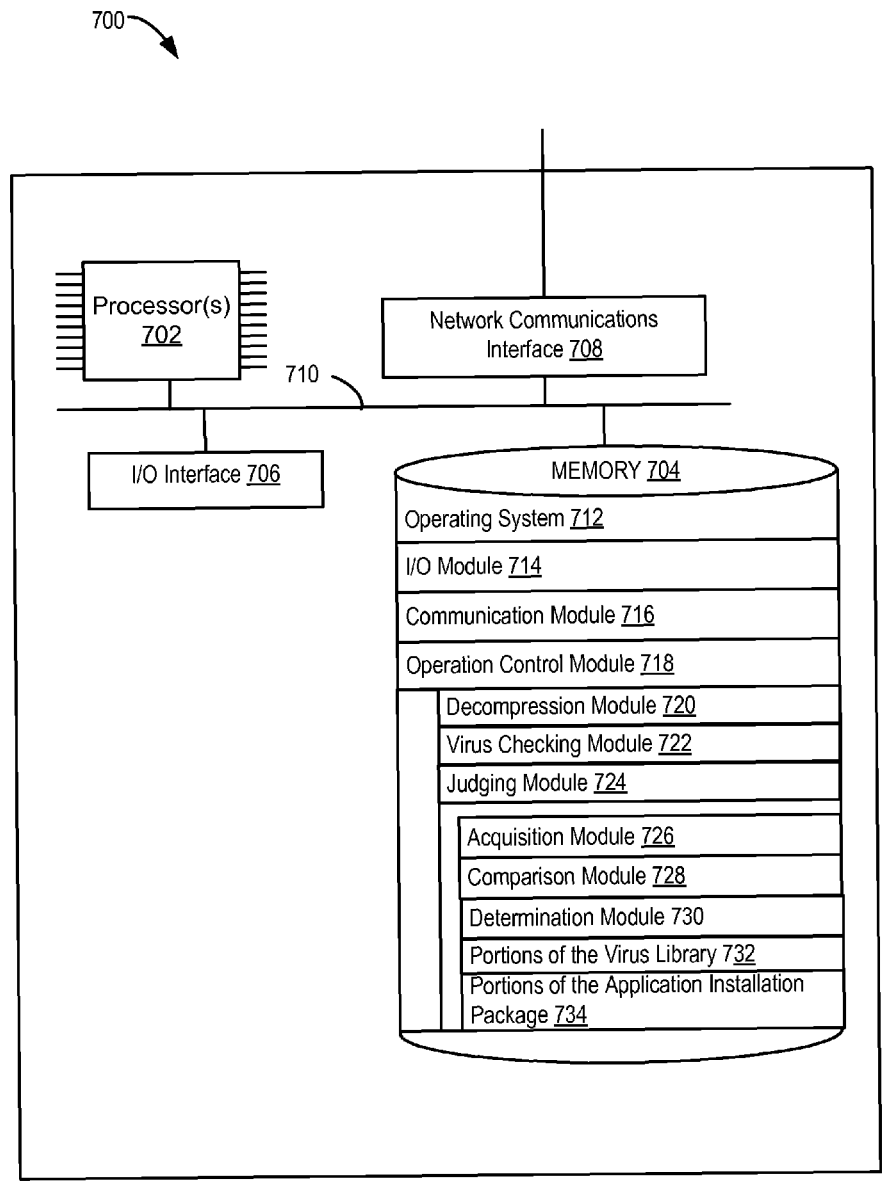
FIG. 7 is a block diagram of an exemplary system for implementing the invention in accordance with some embodiments.

FIG. 7 is a block diagram of a system 700 that perform the methods described above, in accordance with some embodiments.

As shown in FIG. 7, the system 700 includes one or more processing units (or "processors") 702, memory 704, an input/output (I/O) interface 706, and a network communications interface 708. These components communicate with one another over one or more communication buses or signal lines 710. In some embodiments, the memory 704, or the computer readable storage media of memory 704, stores programs, modules, instructions, and data structures including all or a subset of: an operating system 712, an I/O module 714, a communication module 716, and an operation control module 718. The one or more processors 702 are coupled to the memory 704 and operable to execute these programs, modules, and instructions, and reads/writes from/to the data structures.

In some embodiments, the processing units 702 include one or more microprocessors, such as a single core or multi-core microprocessor. In some embodiments, the processing units 702 include one or more general purpose processors. In some embodiments, the processing units 702 include one or more special purpose processors. In some embodiments, the processing units 702 include one or more personal computers, mobile devices, handheld computers, tablet computers, or one of a wide variety of hardware platforms that contain one or more processing units and run on various operating systems.

In some embodiments, the memory 704 includes high-speed random access memory, such as DRAM, SRAM, DDR RAM or other random access solid state memory devices. In some embodiments the memory 204 includes non-volatile memory, such as one or more magnetic disk storage devices, optical disk storage devices, flash memory devices, or other non-volatile solid state storage devices. In some embodiments, the memory 704 includes one or more storage devices remotely located from the processing units 702. The memory 704, or alternately the non-volatile memory device(s) within the memory 704, comprises a computer readable storage medium.

In some embodiments, the I/O interface 706 couples input/output devices, such as displays, a keyboards, touch screens, speakers, and microphones, to the I/O module 714 of the system 700. The I/O interface 706, in conjunction with the I/O module 714, receive user inputs (e.g., voice input, keyboard inputs, touch inputs, etc.) and process them accordingly. The I/O interface 706 and the user interface module 714 also present outputs (e.g., sounds, images, text, etc.) to the user according to various program instructions implemented on the system 700.

In some embodiments, the network communications interface 708 includes wired communication port(s) and/or wireless transmission and reception circuitry. The wired communication port(s) receive and send communication signals via one or more wired interfaces, e.g., Ethernet, Universal Serial Bus (USB), FIREWIRE, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 708 enables communication between the system 700 with networks, such as the Internet, an intranet and/or a wireless network, such as a cellular telephone network, a wireless local area network (LAN) and/or a metropolitan area network (MAN), and other devices. The communications module 716 facilitates communications between the system 700 and other devices (e.g., the first client device and the second client device) over the network communications interface 708.

In some embodiments, the operating system 702 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

The system 700 may have more or fewer components than shown, may combine two or more components, or may have a different configuration or arrangement of the components. The various components shown in FIG. 7 may be implemented in hardware, software, firmware, including one or more signal processing and/or application specific integrated circuits, or a combination of thereof.

As shown in FIG. 7, the system 700 stores the operation control module 718 in the memory 704. In some embodiments, the operation control module 718 further includes the followings sub-modules, or a subset or superset thereof: a decompression module 720, a virus checking module 722, and a judging module 724. In some embodiments, the virus checking module 722 further includes an acquisition module 726, a comparison module 728, and a determination module 730. In addition, each of these sub-modules has access to one or more of the following data structures and data sources of the operation control module 218, or a subset or superset thereof: a virus library 732 containing the virus samples, and an application installation package 734. In some embodiments, the operation control module optionally include one or more other modules (e.g., a reading module) to read the virus checking data into memory and/or provide other related functionalities described herein. More details on the structures, functions, and interactions of the sub-modules and data structures of the operation control module 718 are provided with respect to FIGS. 1-6, and accompanying descriptions.

The above-mentioned embodiments only describe several implementation methods of the present invention. The description thereof is relatively specific and detailed, but it could not be understood as restrictions to the patent scope of the present invention. It should be noted that for those skilled in the art, several transformations and improvements can further be made without departing from the concept of the present invention, and these all belong to the scope of protection of the present invention.

What is claimed is:
1. A computer-implemented method, comprising:
   at a device having one or more processors and memory:
      identifying respective uncompressed sub-portions of data embodied in an application installation package in accordance with a predetermined threshold size established for each uncompressed sub-portion;

partially decompressing the application installation package to acquire corresponding decompressed data for one of the identified respective uncompressed sub-portions at a time;

before acquiring the corresponding decompressed data of all of the respective uncompressed sub-portions of the data embodied in the application installation package, checking the corresponding decompressed data of a first respective uncompressed sub-portion of the data embodied in the application installation package according to virus samples in a virus feature library; and concluding that the application installation package is a virus-infected file or rogue software in accordance with a determination that the corresponding decompressed data of the first respective uncompressed sub-portion includes respective features of at least one of the virus samples wherein each of the virus samples includes a respective offset address and a respective virus signature, wherein checking the corresponding decompressed data of the first respective sub-portion according to the virus samples in the virus feature library further comprises:

acquiring, from the corresponding decompressed data of the first respective sub-portion, respective virus checking data, wherein the respective virus checking data starts from an offset address corresponding to the respective offset address of a first virus sample, and has a length equal to a respective length of a respective virus signature of the first virus sample;

making a comparison of the respective virus checking data with the respective virus signature of the first virus sample; and determining that the respective decompressed data of the first respective sub-portion contains the first virus sample when the virus checking data is consistent with the respective virus signature of the first virus sample, and wherein the acquiring further comprise:

identifying, from among the respective uncompressed sub-portions of the data embodied in the application installation package, a next uncompressed sub-portion for which virus checking has not been performed;

determining whether the corresponding decompressed data of the identified next uncompressed sub-portion has a length greater than or equal to the respective length of the respective virus signature of the first virus sample, starting from the offset address corresponding to the respective offset address of the first virus sample; and in accordance with a determination that the corresponding decompressed data of the identified uncompressed sub-portion does not have a sufficient length starting from the offset address corresponding to the respective offset address of the first virus sample, acquiring, the virus checking data from the corresponding uncompressed data of at least one additional uncompressed sub-portion for which virus checking has not been performed, wherein the virus checking data includes decompressed data corresponding to all offset addresses between a starting offset address and an ending offset address, wherein the starting offset address is the respective offset address of the first virus sample, and the ending offset address is an offset address formed by the starting offset address plus the respective length of the respective virus signature of the first virus sample.

2. The method of claim 1, further comprising:
continuing the decompression of the application installation package to acquire the respective uncompressed sub-portions and the checking of the corresponding decompressed data of the respective uncompressed sub-portions, one sub-portion at a time, until it is determined that the application installation package is a virus-infected file or rogue software.

3. The method of claim 1, further comprising:
continuing the decompression of the application installation package to acquire the respective uncompressed sub-portions and the checking of the corresponding decompressed data of the respective uncompressed sub-portions, one sub-portion at a time, until the decompression and checking of the application installation package is completed.

4. The method of claim 1, further comprising:
continuing the decompression of application installation package to acquire the respective uncompressed sub-portions and the checking of the corresponding decompressed data of the respective uncompressed sub-portions in parallel, until the decompression of the application installation package is completed.

5. A non-transitory computer-readable medium, having instructions stored thereon, the instructions, when executed by one or more processors, cause the processors to perform operations comprising:

identifying respective uncompressed sub-portions of data embodied in an application installation package in accordance with a predetermined threshold size established for each uncompressed sub-portion;

partially decompressing the application installation package to acquire corresponding decompressed data for each one of the identified respective uncompressed sub-portions at a time;

before acquiring the corresponding decompressed data of all of the respective uncompressed sub-portions of the data embodied in the application installation package, checking the corresponding decompressed data of a first respective uncompressed sub-portion of the data embodied in the application installation package according to virus samples in a virus feature library; and concluding that the application installation package is a virus-infected file or rogue software in accordance with a determination that the corresponding decompressed data of the first respective uncompressed sub-portion includes respective features of at least one of the virus samples.

wherein each of the virus samples includes a respective offset address and a respective virus signature, wherein checking the corresponding decompressed data of the first respective sub-portion according to the virus samples in the virus feature library further comprises:

acquiring, from the corresponding decompressed data of the first respective sub-portion, respective virus checking data, wherein the respective virus checking data starts from an offset address corresponding to the respective offset address of a first virus sample, and has a length equal to a respective length of a respective virus signature of the first virus sample;

making a comparison of the respective virus checking data with the respective virus signature of the first virus sample; and determining that the respective decompressed data of the first respective sub-portion contains the first virus sample when the virus checking data is consistent with the respective virus signature of the first virus sample, and wherein the acquiring further comprise:

identifying, from among the respective uncompressed sub-portions of the data embodied in the application installation package, a next uncompressed sub-portion for which virus checking has not been performed;

determining whether the corresponding decompressed data of the identified next uncompressed sub-portion has a length greater than or equal to the respective length of the respective virus signature of the first virus sample, starting from the offset address corresponding to the respective offset address of the first virus sample; and in accordance with a determination that the corresponding decompressed data of the identified uncompressed sub-portion does not have a sufficient length starting from the offset address corresponding to the respective offset address of the first virus sample, acquiring, the virus checking data from the corresponding uncompressed data of at least one additional uncompressed sub-portion for which virus checking has not been performed, wherein the virus checking data includes decompressed data corresponding to all offset addresses between a starting offset address and an ending offset address, wherein the starting offset address is the respective offset address of the first virus sample, and the ending offset address is an offset address formed by the starting offset address plus the respective length of the respective virus signature of the first virus sample.

6. The computer-readable medium of claim 5, wherein the operations further comprise:

continuing the decompression of the application installation package to acquire the respective uncompressed sub-portions and the checking of the corresponding decompressed data of the respective uncompressed sub-portions, one sub-portion at a time, until it is determined that the application installation package is a virus-infected file or rogue software.

7. The computer-readable medium of claim 5, wherein the operations further comprise:

continuing the decompression of the application installation package to acquire the respective uncompressed sub-portions and the checking of the corresponding decompressed data of the respective uncompressed sub-portions, one sub-portion at a time, until the decompression and checking of the application installation package is completed.

8. The computer-readable medium of claim 5, wherein the operations further comprise:

continuing the decompression of application installation package to acquire the respective uncompressed sub-portions and the checking of the corresponding decompressed data of the respective uncompressed sub-portions in parallel, until the decompression of the application installation package is completed.

9. A system, comprising:

one or more processors; and memory having instructions stored thereon, the instructions, when executed by the one or more processors, cause the processors to perform operations comprising:

identifying respective uncompressed sub-portions of data embodied in an application installation package in accordance with a predetermined threshold size established for each uncompressed sub-portion;

partially decompressing the application installation package to acquire corresponding decompressed data for each one of the identified respective uncompressed sub-portions at a time;

before acquiring the corresponding decompressed data of all of the respective uncompressed sub-portions of the data embodied in the application installation package, checking the corresponding decompressed data of a first respective uncompressed sub-portion of the data embodied in the application installation package according to virus samples in a virus feature library; and concluding that the application installation package is a virus-infected file or rogue software in accordance with a determination that the corresponding decompressed data of the first respective uncompressed sub-portion includes respective features of at least one of the virus samples.

wherein each of the virus samples includes a respective offset address and a respective virus signature, wherein checking the corresponding decompressed data of the first respective sub-portion according to the virus samples in the virus feature library further comprises:

acquiring, from the corresponding decompressed data of the first respective sub-portion, respective virus checking data, wherein the respective virus checking data starts from an offset address corresponding to the respective offset address of a first virus sample, and has a length equal to a respective length of a respective virus signature of the first virus sample;

making a comparison of the respective virus checking data with the respective virus signature of the first virus sample; and determining that the respective decompressed data of the first respective sub-portion contains the first virus sample when the virus checking data is consistent with the respective virus signature of the first virus sample, and wherein the acquiring further comprise:

identifying, from among the respective uncompressed sub-portions of the data embodied in the application installation package, a next uncompressed sub-portion for which virus checking has not been performed;

determining whether the corresponding decompressed data of the identified next uncompressed sub-portion has a length greater than or equal to the respective length of the respective virus signature of the first virus sample, starting from the offset address corresponding to the respective offset address of the first virus sample; and in accordance with a determination that the corresponding decompressed data of the identified uncompressed sub-portion does not have a sufficient length starting from the offset address corresponding to the respective offset address of the first virus sample, acquiring, the virus checking data from the corresponding uncompressed data of at least one additional uncompressed sub-portion for which virus checking has not been performed, wherein the virus checking data includes decompressed data corresponding to all offset addresses between a starting offset address and an ending offset address, wherein the starting offset address is the respective offset address of the first virus sample, and the ending offset address is an offset address formed by the starting offset address plus the respective length of the respective virus signature of the first virus sample.

10. The system of claim 9, wherein the operations further comprise:

continuing the decompression of the application installation package to acquire the respective uncompressed sub-portions and the checking of the corresponding decompressed data of the respective uncompressed sub-portions, one sub-portion at a time, until it is determined that the application installation package is a virus-infected file or rogue software.

11. The system of claim 9, wherein the operations further comprise:

continuing the decompression of the application installation package to acquire the respective uncompressed sub-portions and the checking of the corresponding decompressed data of the respective uncompressed sub-portions, one sub-portion at a time, until the decompression and checking of the application installation package is completed.

12. The system of claim 9, wherein the operations further comprise:

continuing the decompression of application installation package to acquire the respective uncompressed sub-portions and the checking of the corresponding decompressed data of the respective uncompressed sub-portions in parallel, until the decompression of the application installation package is completed.

* * * * *